(12) United States Patent
Thomas et al.

(10) Patent No.: US 7,484,757 B2
(45) Date of Patent: Feb. 3, 2009

(54) AIR BAG WITH A SUPPORTED CHANNEL

(75) Inventors: Scott D. Thomas, Novi, MI (US); James M. Kumkoski, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 372 days.

(21) Appl. No.: 11/297,038

(22) Filed: Dec. 8, 2005

(65) Prior Publication Data

US 2007/0132222 A1    Jun. 14, 2007

(51) Int. Cl.
*B60R 21/16* (2006.01)
(52) U.S. Cl. .................................................. 280/743.2
(58) Field of Classification Search .............. 280/729, 280/743.1, 743.2
See application file for complete search history.

(56) References Cited

U.S. PATENT DOCUMENTS

| | | | | |
|---|---|---|---|---|
| 5,362,101 | A * | 11/1994 | Sugiura et al. | 280/743.2 |
| 5,380,038 | A * | 1/1995 | Hawthorn et al. | 280/730.1 |
| 5,945,184 | A * | 8/1999 | Nagata et al. | 428/35.2 |
| 7,152,880 | B1 * | 12/2006 | Pang et al. | 280/743.2 |
| 2003/0218325 | A1 | 11/2003 | Hasebe et al. | |
| 2004/0155439 | A1 | 8/2004 | Hasebe et al. | |
| 2004/0232681 | A1 | 11/2004 | Adomeit | |
| 2005/0098994 | A1 | 5/2005 | Matsumura | |
| 2005/0110249 | A1 * | 5/2005 | Hasebe et al. | 280/729 |
| 2005/0161918 | A1 * | 7/2005 | Bito | 280/732 |
| 2005/0212275 | A1 * | 9/2005 | Hasebe | 280/743.1 |
| 2006/0186647 | A1 * | 8/2006 | Bosch | 280/729 |

FOREIGN PATENT DOCUMENTS

| | | |
|---|---|---|
| DE | 20317038 U1 | 3/2004 |
| EP | 0943499 A1 | 2/1999 |
| JP | 11321506 A | 11/1999 |
| WO | 2006127653 A2 | 11/2006 |

* cited by examiner

*Primary Examiner*—John Q. Nguyen
*Assistant Examiner*—Robert A. Coker

(57) ABSTRACT

An air bag system includes an inflator operable to release inflation fluid, and an inflatable cushion having an lower region and inflatable upon release of inflation fluid from the inflator, with the cushion defining a channel within the lower region thereof. At least one tether may support the channel during inflation of the cushion. A fabric member may at least partially cover the channel to define an end channel wall. The fabric member may detach from the cushion if the cushion inflates beyond a predetermined depth, or the fabric member may be movable between a first position and a second position to increase the area of the end channel wall. A retention member may retain the fabric member in the first position. The retention member may be frangible, such that inflation of the cushion beyond the predetermined depth breaks the retention member.

5 Claims, 4 Drawing Sheets

US 7,484,757 B2

AIR BAG WITH A SUPPORTED CHANNEL

TECHNICAL FIELD

This invention relates to an automotive vehicle air bag system, and more particularly to an air bag cushion having a supported channel integrally formed therein.

BACKGROUND OF THE INVENTION

Air bag systems in automotive vehicles generally include an air bag cushion that is designed to deploy within a passenger compartment of the automotive vehicle when triggered by a sensor signal. For example, air bag systems might be deployed upon sudden deceleration of a vehicle or upon impact of the vehicle with another object. The art continues to investigate improvements for air bag systems.

SUMMARY OF THE INVENTION

The present invention provides an air bag system including an inflator operable to release inflation fluid, and an inflatable cushion having a lower region and inflatable upon release of inflation fluid from the inflator, with the cushion defining a channel within the lower region thereof. The channel preferably has a U-shaped or a V-shaped cross-section, and may be configured to extend from the front to the rear of the inflatable cushion. At least one tether may support the channel during inflation of the cushion. The tether preferably attaches to the inflatable cushion to restrict ballooning during inflation thereof. The channel may be formed within the lower region by sewing. The air bag system may include a sensing tether operable to modify release of inflation fluid if an obstacle interferes with the channel during inflation. The sensing tether itself may further support the channel during inflation. A fabric member may at least partially cover the channel to define an end channel wall. In one aspect of the invention, inflation of the cushion beyond a predetermined depth at least partially detaches the fabric member from the cushion. In another aspect of the invention, the fabric member is movable between a first position wherein the end channel wall has a first area, and a second position wherein the end channel wall has a second area, with the second area being greater than the first area. A retention member may retain the fabric member in the first position. The retention member may be frangible, such that inflation of the cushion beyond a predetermined depth breaks the retention member, thereby causing the fabric member to move to the second position.

The present invention also provides an air bag system including an inflator, and an inflatable cushion having a lower region and inflatable upon release of inflation fluid by the inflator, wherein the cushion defines a channel within the lower region. The channel includes first and second channel walls providing a channel shape, and is sufficiently supported to substantially maintain the channel shape when inflation fluid fills the inflatable cushion. The air bag system may include at least one tether sufficiently supporting the channel to maintain the channel shape. A fabric member may at least partially cover the channel to define an end channel wall. The tether may attach to the channel and to the inflatable cushion at at least four attachment points to sufficiently support the channel.

The above features and advantages and other features and advantages of the present invention are readily apparent from the following detailed description of the best modes for carrying out the invention when taken in connection with the accompanying drawings.

DESCRIPTION OF PREFERRED EMBODIMENTS

Figure 1:
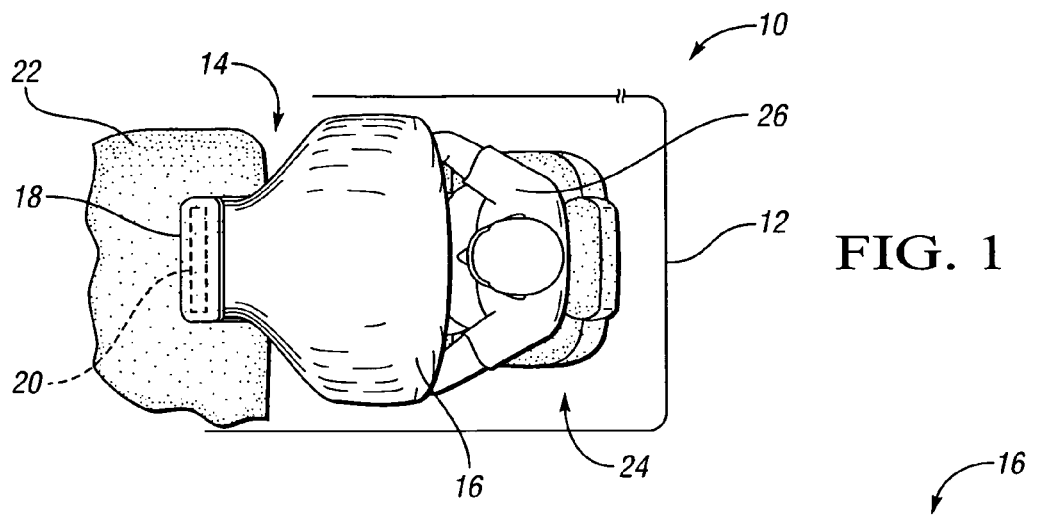
FIG. 1 is a schematic plan view illustration of an air bag system mounted to a vehicle.

Referring to the drawings, wherein like reference numbers refer to like components, FIG. 1 shows a vehicle 10 having a vehicle body 12. Throughout the description of preferred embodiments, directional terms such as forward and rearward or fore and aft are generally defined with respect to the vehicle 10. An air bag system 14 is mounted to the vehicle 10. The air bag system includes an inflatable cushion 16 connected to an air bag housing 18. An inflator 20 is mounted within the housing 18. The housing 18 is shown mounted within an instrument panel 22, although it may be mounted elsewhere on the vehicle 10 within the scope of the invention, such as within a seat back, a vehicle pillar structure, or a vehicle side door. The inflatable cushion 16 is selectively deployable into an interior space 24 toward an occupant 26 upon release of inflation gas by the inflator 20. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the inflatable cushion 16.

Figure 2:
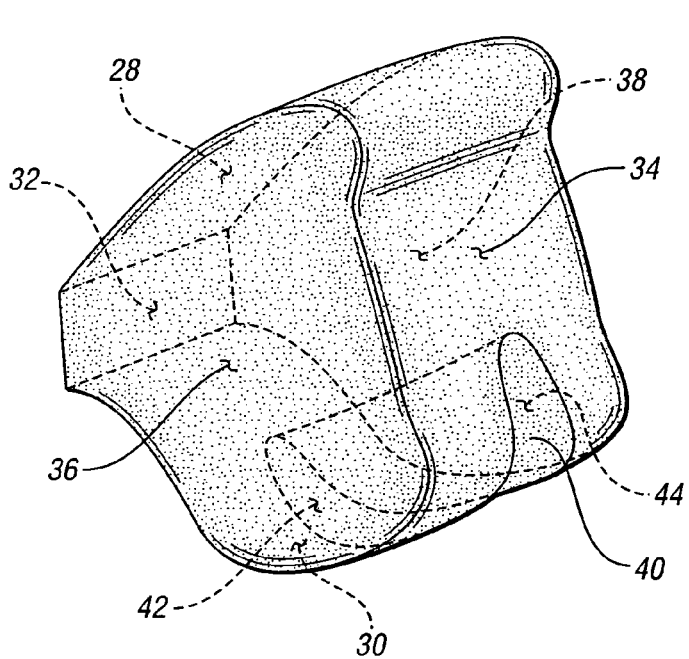
FIG. 2 is a schematic perspective view of an inflatable cushion of the air bag system of FIG. 1, showing a channel defined within the lower region of the cushion.

FIG. 2 presents a schematic view of the inflatable cushion 16 when filled with inflation gas. The inflatable cushion 16 is formed from at least one fabric panel as known in the art, and includes six regions: a lower region 30, a second region 28 generally opposite the lower region 30, a third region 32, a fourth region 34 generally opposite the third region 32, a fifth region 36, and a sixth region 38 generally opposite the fifth region 36. As shown in the drawings and as described herein, the lower region 30 is at a bottom of the inflatable cushion 16 with respect to the vehicle 10. Similarly, the third and fourth regions 32, 34 are generally forward and rearward, respectively, with respect to the vehicle 10, such that the third region 32 represents a front of the inflatable cushion 16 and the fourth region represents a rear of the inflatable cushion 16. Likewise, the fifth and sixth regions 36, 38 extend between the third and fourth regions 32, 34 generally left and right, respectively, with respect to the vehicle 10, such the fifth region 36 represents a first side of the inflatable cushion 16, and the sixth region 38 represents a second side of the inflatable cushion 16. Each region may be formed from more than one piece of fabric, i.e., the lower region 30 may comprise two pieces of fabric. Conversely, more than one region may be formed from a single piece of fabric, i.e., the second region 28, lower region 30, and third region 32 may be a single piece of fabric.

Figure 3:
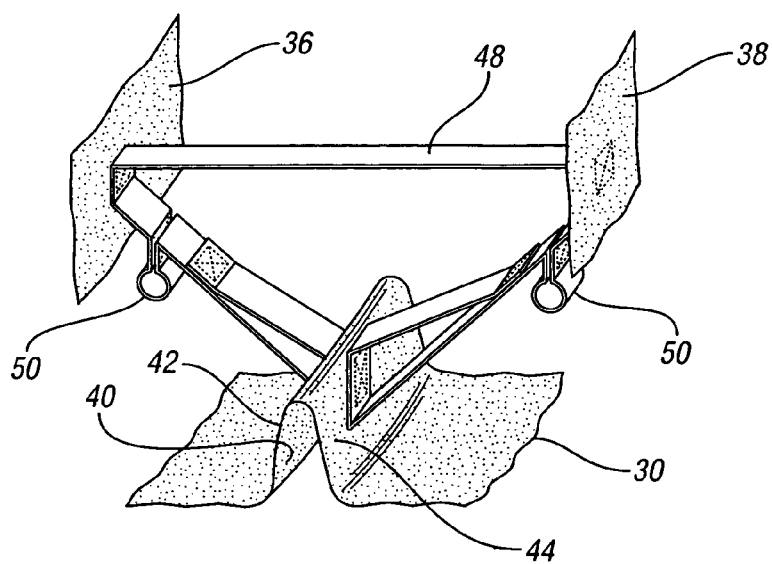
FIG. 3 is a fragmentary perspective view of the cushion of FIG. 2 showing a first tether supporting the channel.

As shown in FIG. 2, the inflatable cushion 16 defines a channel 40 within the lower region 30. Specifically, the inflatable cushion 16 defines first and second channel walls 42, 44 within the lower region 30, such that the channel 40 is substantially V-shaped. The channel 40 is sufficiently supported to maintain the V-shape throughout inflation of the inflatable cushion 16. The channel 40 may be sewn or stitched as known in the art directly into the inflatable cushion 16 and sufficiently reinforced so as to maintain the V-shape. As shown in FIG. 3, a first tether 48 may be utilized in conjunction with the stitched-in channel 40 to further support the channel 40 during inflation of the inflatable cushion 16. Alternatively, the first tether 48 may be used to create the channel 40 during inflation; that is, the channel 40 may not be stitched directly into the inflatable cushion 16.

FIG. 3 shows a fragmentary view of the inflatable cushion 16 of FIG. 2 with the first tether 48 supporting the channel 40. Specifically, the first tether 48 attaches to the first and second channel walls 42, 44, and to the fifth and sixth regions 36, 38 of the inflatable cushion 16, with each attachment defining an attachment point. It should be noted that the first tether 48 may attach to the third and fourth regions 32, 34 of the inflatable cushion 16 (as shown in FIG. 2) instead of the fifth and sixth regions 36, 38 without changing the inventive concept. The first tether 48 is preferably stitched to the various portions of the inflatable cushion 16 to which it attaches. However, in this embodiment and all other embodiments described herein, the inflatable cushion 16 may define a pleat through which the first tether 48 is routed, or the inflatable cushion 16 may define a pleat or selvage seam to which the first tether 48 is sewn, as known in the art. Reinforcement patches may be utilized at the attachment points to increase structural integrity of the inflatable cushion 16.

The stitching is preferably disposed inside of the inflatable cushion 16, thereby minimizing rough surfaces within the channel 40. A separate piece of fabric may line an exterior side of the channel 40 to further prevent abrasive surfaces therein. When inflation fluid fills the inflatable cushion 16, the first tether 48 is pulled taut, thereby supporting the channel 40 to maintain the V-shape. Since the first tether 48 also attaches to the fifth and sixth regions 36, 38, the first tether 48 may also constrain outward bulging of the fifth and sixth regions 36, 38 during inflation, thereby acting as a lateral tether. Additionally, the channel 40 is preferably sewn directly into the inflatable cushion 16, thereby enhancing maintenance of the V-shape.

As shown in FIG. 3, the first tether 48 includes loops 50, with tear stitching forming the loops 50, thereby allowing the inflatable cushion 16 to be deployed to one of two positions, with the channel 40 properly supported in each position. For instance, if deployment of the inflatable cushion 16 is impeded, the loops 50 will not tear at the tear stitching, and thus the first tether 48 can be "fully taut" while the loops 50 remain intact. However, if deployment of the inflatable cushion 16 is not blocked, the first tether 48 tears at the tear stitching as inflation fluid fills the inflatable cushion 16, thereby lengthening the first tether 48 by the length of the loops 50. Since the first tether 48 is longer when deployment of the inflatable cushion 16 is not blocked, the channel 40 will be further away from the second region 28 than when the loops 50 do not tear. A plurality of loops 50 may be utilized on any portion of the first tether 48, such that the first tether 48 will support the channel 40 at a plurality of different depths of the inflatable cushion 16. It can thus be seen that the first tether 48 can be of a fixed length or a varying length within the scope of the present invention.

As another alternative, the first tether 48 can be attached at at least one of the attachment points using tear stitching, such that the first tether 48 tears away from the inflatable cushion 16 at the at least one attachment point when deployment of the inflatable cushion 16 is not blocked. If the first tether 48 tears away from the inflatable cushion 16, the channel 40 will at least partially collapse if the first tether 48 is the only way of supporting the channel 40 (i.e., sewing is not used as a means of supporting the channel 40). It should be noted that the term "attachment point" as used herein is merely descriptive. The first tether 48 may attach to the inflatable cushion 16 in many different ways without changing the inventive concept. For instance, the first tether 48 may attach the fifth and sixth regions 36, 38 down the entire length thereof to provide additional stability to the channel 40 upon inflation. Additionally, the first tether 48 may comprise a flat piece of fabric, as generally depicted in the drawings, or it may be reinforced, folded, twisted, made of multiple fabric members, or otherwise configured within the scope of the present invention.

Figure 4:
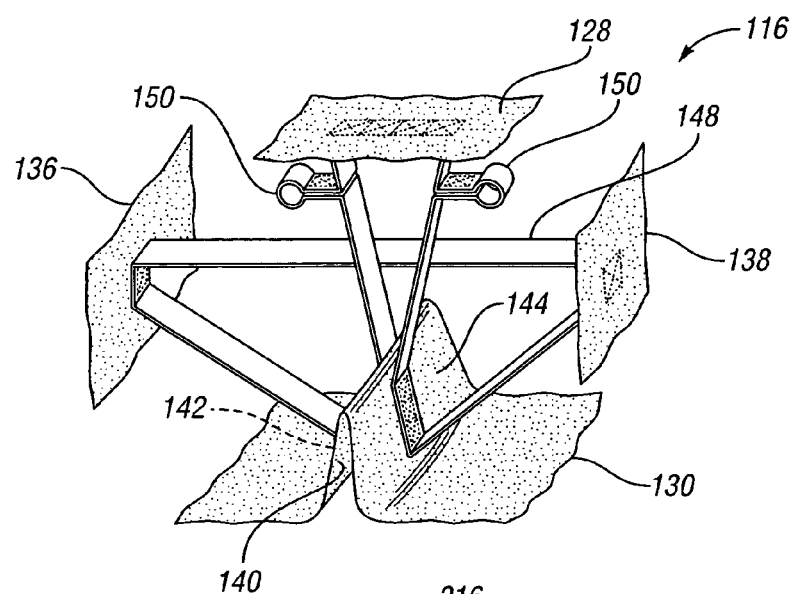
FIG. 4 is a fragmentary perspective view of a second embodiment of an inflatable cushion according to the present invention.

FIG. 4 shows a second embodiment of an inflatable cushion 116 incorporating the present invention. A first tether 148 at least partially supports a substantially V-shaped channel 140 defined by an inflatable cushion 116. Specifically, the channel 140 is disposed within a lower region 130 of the inflatable cushion 116. The first tether 148 attaches to the channel 140 at first and second channel walls 142, 144, and to the inflatable cushion 116 at fifth and sixth regions 136, 138 and a second region 128. The first tether 148 includes loops 150, with tear stitching forming the loops 150 to allow the first tether 148 to support the channel 140 when the inflatable cushion 116 reaches varying depths.

Figure 5:
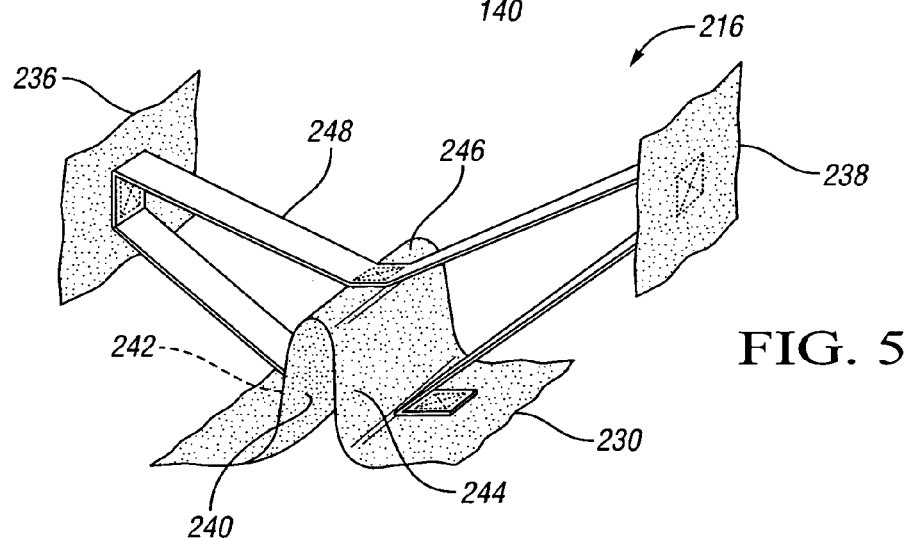
FIG. 5 is a fragmentary perspective view of a third embodiment of an inflatable cushion according to the present invention.

FIG. 5 shows a third embodiment of an inflatable cushion 216 incorporating the present invention. A first tether 248 at least partially supports a channel 240 defined by an inflatable cushion 216 and disposed within a lower region 230 of the inflatable cushion 216. Specifically, the inflatable cushion 216 defines first, second and third channel walls 242, 244, 246 within the lower region 230, such that the channel 240 is substantially U-shaped. In this embodiment, the first tether 248 attaches to the inflatable cushion 216 at five attachment points: the lower region 230 at a bottom of both the first and second channel walls 242, 244, a fifth region 236, a sixth region 238, and the third channel wall 246.

Figure 6:
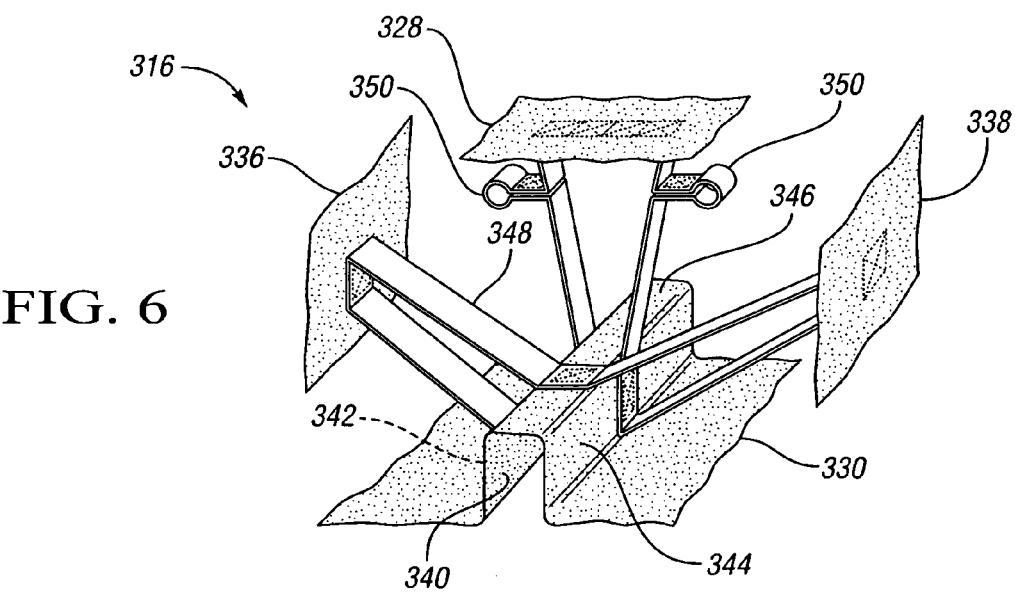
FIG. 6 is a fragmentary perspective view of a fourth embodiment of an inflatable cushion according to the present invention.

FIG. 6 shows a fourth embodiment of an inflatable cushion 316 incorporating the present invention. A first tether 348 at least partially supports a channel 340 defined by an inflatable cushion 316 and within a lower region 330 of the inflatable cushion 316. The inflatable cushion 316 defines first, second and third channel walls 342, 344, 346 within the lower region 330, thereby imparting a U-shape to the channel 340. The first tether 348 attaches to the first, second and third channel walls 342, 344, 346, fifth and sixth regions 336, 338, and a second region 328. The first tether 348 includes loops 350, with tear stitching forming the loops 350 to allow the first tether 348 to support the channel 340 when the inflatable cushion 316 reaches varying depths as described with respect to previous embodiments.

Figure 7:
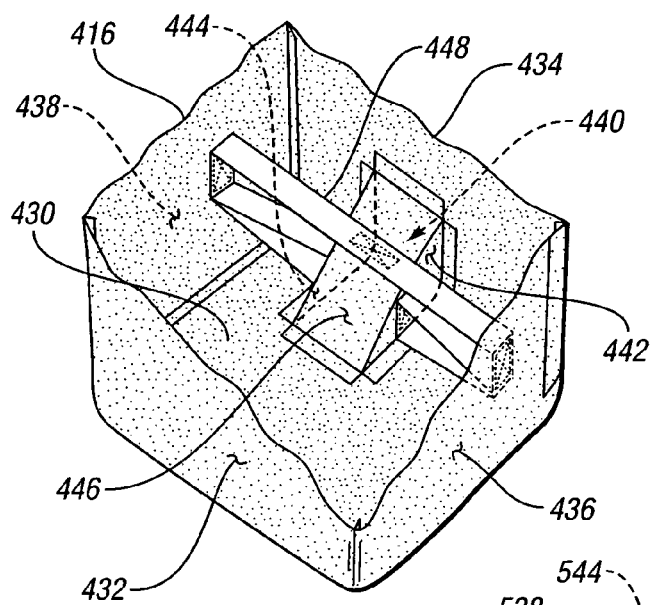
FIG. 7 is a fragmentary perspective view of a fifth embodiment of an inflatable cushion according to the present invention.

FIG. 7 shows a fragmentary perspective view of a fifth embodiment of an inflatable cushion 416 incorporating the present invention. A first tether 448 at least partially supports a channel 440 defined by an inflatable cushion 416 and disposed within a lower region 430 of the inflatable cushion 416. In this embodiment, the channel 440 does not run the entire length of the inflatable cushion 416. Instead, the lower region 430 defines first, second and third channel walls 442, 444, 446, with the third channel wall 446 being inclined, such that the channel 440 has a substantially triangular cross-section in one direction, while maintaining a substantially U-shaped cross-section in a perpendicular direction. The channel 440 preferably opens at a fourth region 434 of the inflatable cushion 416 and extends forward until the third channel wall 446 meets the lower region 430. However, the channel 440 could open at a third region 432 of the inflatable cushion 416 and extend rearward, or open at a fifth region 436 or a sixth region 438 (i.e., such that the channel 440 travels left to right with respect to the vehicle 10 of FIG. 1 instead of fore to aft), without changing the inventive concept. As shown, the first tether 448 attaches to the first, second and third channel walls 442, 444, 446, and to the fifth and sixth regions 436, 438 to support the channel 440 throughout inflation of the inflatable cushion 416. However, if the channel 440 opens at a different region, the first tether 448 would attach to respectively different regions to at least partially support the channel 440. In addition, the first tether 448 can be sewn to the inflatable cushion 416 to form a rectangular shape as opposed to a triangular shape without changing the inventive concept.

Figure 8:
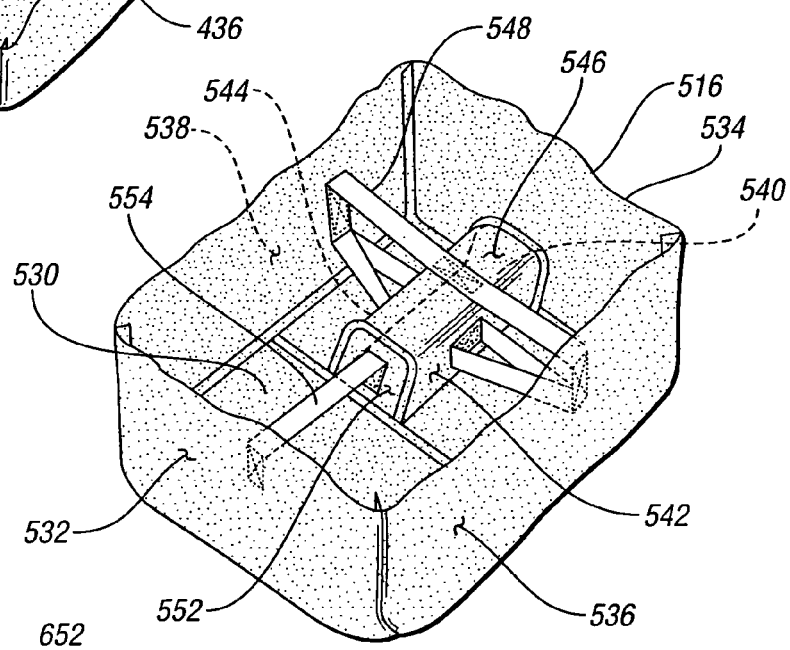
FIG. 8 is a fragmentary perspective view of a sixth embodiment of an inflatable cushion according to the present invention.

FIG. 8 shows a fragmentary perspective view of a sixth embodiment of an inflatable cushion 516 incorporating the present invention. First and second tethers 548, 554 at least partially support a channel 540 defined by an inflatable cushion 516, and disposed within a lower region 530 of the inflatable cushion 516. Specifically, the lower region 530 defines first, second, third and fourth channel walls 542, 544, 546, 552, such that the channel 540 has a substantially U-shaped cross-section and does not extend from a third region 532 to a fourth region 534 of the inflatable cushion 516. The channel 540 opens at the fourth region 534 and extends forward to the fourth channel wall 552 as shown. Thus, the first tether 548 attaches to fifth and sixth regions 536, 538, and to the first, second and third channel walls 542, 544, 546, while the second tether 554 attaches to the fourth channel wall 552 and the third region 532 of the inflatable cushion 516.

Figure 9:
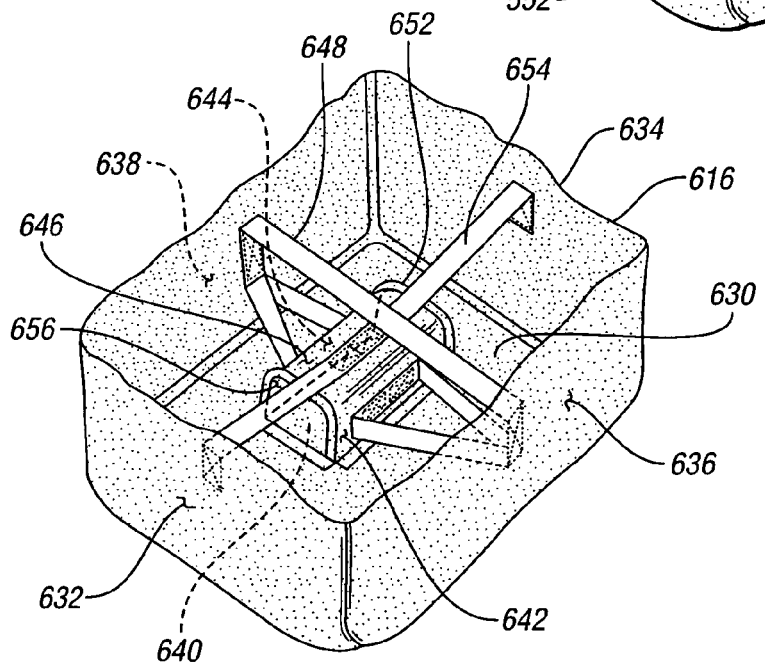
FIG. 9 is a fragmentary perspective view of a seventh embodiment of an inflatable cushion according to the present invention.

FIG. 9 shows a fragmentary perspective view of a seventh embodiment of an inflatable cushion 616 incorporating the present invention. First and second tethers 648, 654 at least partially support a channel 640 defined by an inflatable cushion 616 within a lower region 630 of the inflatable cushion 616. Specifically, the lower region 630 defines first, second, third, fourth and fifth channel walls 642, 644, 646, 652, 656, such that the channel 630 is formed wholly within the lower region 630. The first tether 648 attaches to fifth and sixth regions 636, 638, and to the first and second channel walls 642, 644. The second tether 654 extends between third and fourth regions 632, 634 of the inflatable cushion 616, and also attaches to the third channel wall 646. As with previous embodiments, the orientation of the channel 640 within the lower region 630 may differ, with the first and second tethers 648, 654 then attaching to respectively different regions of the inflatable cushion 616.

Figure 10:
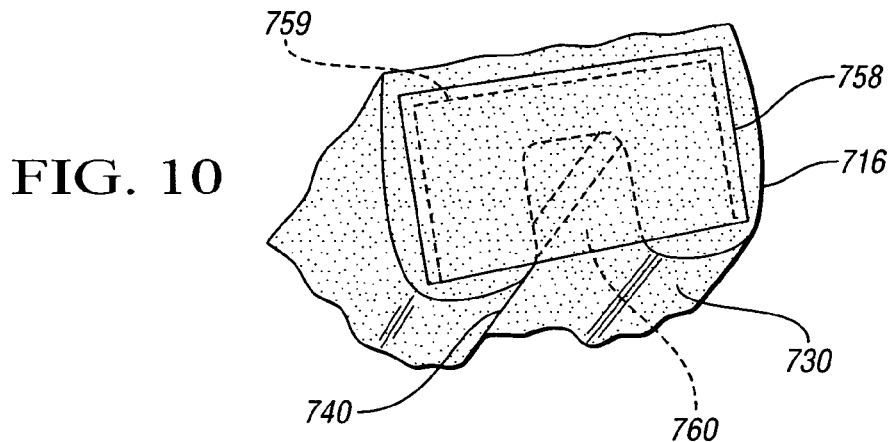
FIG. 10 is a schematic perspective view of an eight embodiment of an inflatable cushion according to the present invention, including a fabric member at least partially covering a channel.

FIG. 10 shows a fabric member 758 attached to an inflatable cushion 716. The fabric member 758 at least partially covers a channel 740 defined by the inflatable cushion 716 within a lower region 730 thereof, such that the fabric member 758 defines an end channel wall 760. Although not shown, two fabric members may be utilized, thus defining two end channel walls. The fabric member 758 may be integral with the inflatable cushion 716, or it may be a separate piece of fabric stitched thereto using stitching 759. The fabric member 758 may attach to the inflatable cushion 716 using permanent stitching, or using a temporary attachment feature such as tear stitching. If a temporary attachment feature is employed, at least a portion of the fabric member 758 may detach from the inflatable cushion 716 if the fabric member 758 contacts an obstacle during deployment of the inflatable cushion 716, thereby decreasing the area of the end channel wall 760 such that the fabric member 758 covers less of the channel 740. Additionally, the fabric member 758 may be sewn to the inflatable cushion 716 such that the stitching does not span the entire length of the fabric member 748, thereby allowing at least a portion of the fabric member 758 to move in response to contact with an obstacle during deployment. Thus, if the fabric member 758 contacts an obstacle, the area of the end channel wall 760 will decrease such that the fabric member 758 covers less of the channel 740. The fabric member 758 may include an extension (not shown) that can be folded around the inflatable cushion 716 prior to installation within the air bag housing 18 of FIG. 1.

Figure 11A:
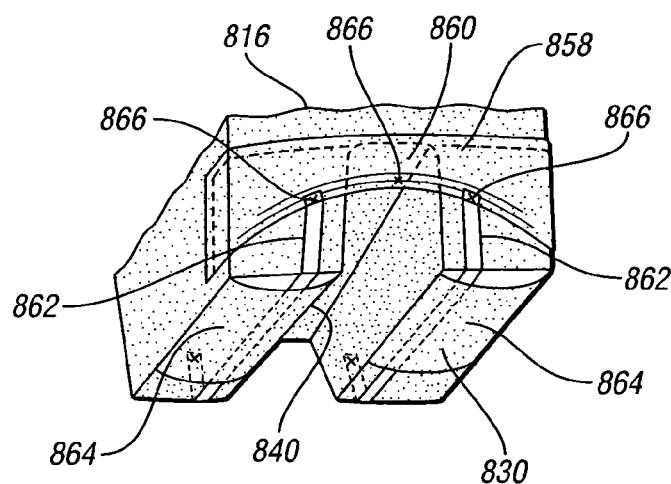
FIG. 11A is a schematic perspective view of a ninth embodiment of an inflatable cushion according to the present invention, including a fabric member in a first position.
Figure 11B:
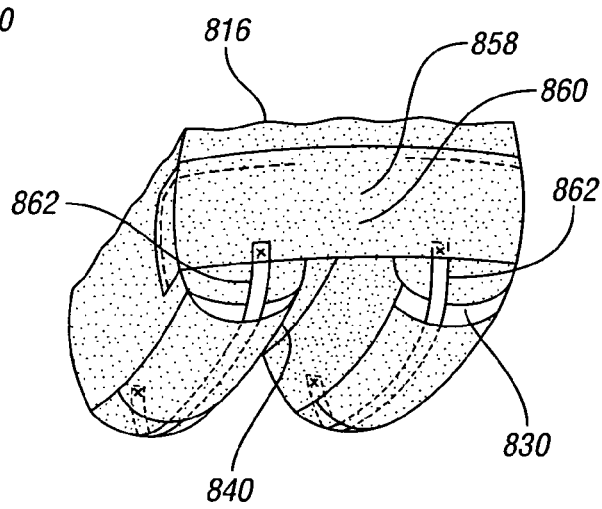
FIG. 11B is a schematic perspective view of the cushion of FIG. 11A, with the fabric member in a second position.

FIGS. 11A and 11B show an alternative embodiment of a fabric member 858 attached to an inflatable cushion 816. The fabric member 858 at least partially covers a channel 840 defined by the inflatable cushion 816 within a lower region 830 of the inflatable cushion 816, thereby defining an end channel wall 860. As shown in FIG. 11A, a retention member such as tear stitching is used at at least one attachment point 866 to initially hold the fabric member 858 in a raised position, such that the channel 840 remains substantially open. If the inflatable cushion 816 encounters an obstacle during deployment, the cushion 816 will not inflate enough to tear the tear stitching, and thus the channel 840 will remain substantially open. If, however, the inflatable cushion 816 inflates beyond a predetermined depth, the tear stitching will tear at the attachment points 866 from the fluid pressure within the inflatable cushion 816, thereby increasing the area of the end channel wall 860 and allowing the fabric member 858 to substantially cover the channel 840, as shown in FIG. 11B. It should be noted that a different retention member may be utilized other than tear stitching within the scope of the invention. A pair of fabric straps 862 extend underneath strap guide members 864 between the fabric member 858 and a portion of the inflatable cushion 816. If the inflatable cushion 816 fills beyond a predetermined depth, fluid pressure within the inflatable cushion 816 tensions the fabric straps 862 as the inflatable cushion 816 expands, thereby pulling the fabric member 858 downward to increase the area of the end channel wall 860, thus allowing the fabric member 858 to substantially cover the channel 840, as shown in FIG. 11B.

Figure 12:
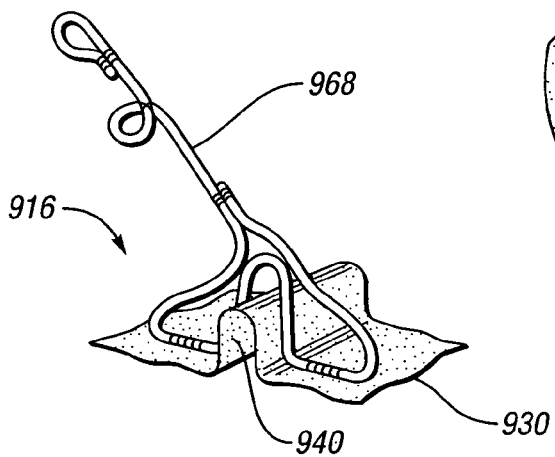
FIG. 12 is a schematic perspective view of a tenth embodiment of an inflatable cushion according to the present invention, showing a sensing tether used to detect an obstacle interfering with a channel during inflation.

FIG. 12 shows a sensing tether 968 for use with a channel 940 defined within a lower region 930 of an inflatable cushion 916 according to the present invention. The sensing tether 968 is preferably coupled to an air bag deployment mechanism within the inflatable cushion 916 or the air bag housing 18 of FIG. 1 to dynamically modify deployment of the inflatable cushion 916. In order to detect whether an obstacle interferes with the inflatable cushion 916 around or in the channel 940 during deployment of the inflatable cushion 916, the sensing tether 968 attaches to the lower region 930 of the inflatable cushion 916 on each side of the channel 940. The sensing tether 968 may be used in addition to the tether or tethers which create the channel 940 as described with respect to previous embodiments, or the first and/or second tethers may function as sensing tethers to modify deployment of the inflatable cushion 916.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
   an inflator operable to release inflation fluid;
   an inflatable cushion having a lower region, said inflatable cushion being inflatable upon release of inflation fluid from said inflator; and
   at least one tether attached to said inflatable cushion at least four attachement points, thereby constraining inflation of said inflatable cushion;
   wherein said inflatable cushion defines a channel within said lower region; and,
   wherein said at least one tether supports said channel during inflation of said inflatable cushion.

2. The air bag system of claim 1, wherein said channel has one of a substantially U-shaped cross-section and a substantially V-shaped cross-section.

3. The air bag system of claim 1, wherein said channel is configured to extend from a front of said inflatable cushion to a rear of said inflatable cushion.

4. The air bag system of claim 1, wherein said channel is formed within said lower region by sewing.

5. An air bag system comprising:
   an inflator operable to release inflation fluid;
   an inflatable cushion having a lower region defining a channel, said inflatable cushion being inflatable upon release of inflation fluid from said inflator; and
   at least one tether attached to said channel and said inflatable cushion;
   wherein said channel is substantially V-shaped, and wherein said at least one tether sufficiently supports said channel at at least four attachment points to maintain V-shape of said channel when inflation fluid fills said inflatable cushion.

* * * * *